(12) United States Patent
Conti et al.

(10) Patent No.: US 6,851,569 B2
(45) Date of Patent: Feb. 8, 2005

(54) REUSABLE LID AND CONTAINER (75) Inventors: Rino Conti, Stoughton, MA (US); Mark J. Keyes, Westford, MA (US)

(73) Assignee: Plastican, Inc., Leominster, MA (US)

( * ) Notice: Subject to any disclaimer, the term of this patent is extended or adjusted under 35 U.S.C. 154(b) by 0 days.

(21) Appl. No.: 10/127,287

(22) Filed: Apr. 22, 2002

(65) Prior Publication Data

US 2003/0197013 A1 Oct. 23, 2003

(51) Int. Cl.[7] .............................................. B65D 41/06
(52) U.S. Cl. ...................... 220/297; 220/300; 220/788; 220/790; 220/281; 220/780; 220/293; 215/216; 215/330; 215/332
(58) Field of Search ................................ 220/281, 780, 220/259.3, 286, 293, 297, 298, 301, 300, 315, 781, 782, 784, 788, 790, 786, 795; 215/330, 216, 332

(56) References Cited

U.S. PATENT DOCUMENTS

| 3,371,817 A | * | 3/1968 | Gasbarra et al. ............. 220/298 |
| 3,784,047 A | * | 1/1974 | Cooper ........................ 220/301 |
| 3,888,383 A |   | 6/1975 | Rowlands .................... 220/265 |
| 3,979,003 A |   | 9/1976 | Allen .......................... 215/256 |
| 4,027,777 A | * | 6/1977 | Blanke, Jr. .................. 220/295 |
| 4,111,329 A |   | 9/1978 | Lampman ................... 220/266 |
| 4,256,474 A | * | 3/1981 | Berger et al. ................. 96/152 |
| 4,288,000 A | * | 9/1981 | Luker et al. ................. 220/281 |
| 4,322,010 A |   | 3/1982 | Curry ......................... 215/256 |
| 4,333,580 A | * | 6/1982 | Sweigart, Jr. .............. 220/4.13 |
| 4,723,686 A | * | 2/1988 | Pennisi ....................... 220/300 |
| 5,072,850 A |   | 12/1991 | Gagnon et al. ............. 230/300 |
| 5,605,244 A |   | 2/1997 | Bradshaw ................... 220/320 |
| 5,676,273 A | * | 10/1997 | Jonkers et al. ............. 220/293 |
| 5,845,820 A |   | 12/1998 | Foster ..................... 222/383.1 |
| 5,992,671 A | * | 11/1999 | Wardani ..................... 220/293 |
| 6,021,917 A | * | 2/2000 | Lovell et al. ............... 220/782 |
| 6,168,035 B1 | * | 1/2001 | McLelland .................. 215/216 |
| 6,402,798 B1 | * | 6/2002 | Kallsen et al. ............. 55/385.3 |
| 6,436,162 B1 | * | 8/2002 | Wake et al. .................. 55/498 |
| 2002/0088811 A1 | * | 7/2002 | Lu ............................. 220/780 |

* cited by examiner

*Primary Examiner*—Lee Young
*Assistant Examiner*—James Smalley
(74) *Attorney, Agent, or Firm*—Pandiscio & Pandiscio (57) ABSTRACT

The combination of a reusable lid and a container, the lid being provided with locking tabs and the container being provided with openings designed to accept the locking tabs and to make an interlocking connection by relatively rotating the lid and container. A latch element is formed on the lid for engagement with one of a plurality of cooperating catch elements formed on the container. The engaged catch element prevents removal of the lid from the container until the latch element is depressed inwardly far enough to allow the lid to be turned to a position in which the tabs may be removed from the openings.

20 Claims, 8 Drawing Sheets

REUSABLE LID AND CONTAINER

This invention relates to sealed containers such as a bucket or pail having a removable lid or cover. More particularly this invention is concerned with providing containers having covers or lids that are capable of providing a sealed closure to preserve the contents of the containers and also can be repeatedly assembled to and removed from the containers.

BACKGROUND OF THE INVENTION

Multi-gallon capacity plastic containers having removable plastic lids or covers are widely used for the storage and transportation of liquid and solid materials, e.g., materials in granular or powder form. For some applications, the lids may be single use, i.e. they may be thrown away after the container has been opened, typically because all of the contents of the container are dispensed after the lid is removed. For other applications a reusable lid must be provided, for example, when it is desired to use only a portion of the contents of the container and to then store the partially filled container for future use. In many cases the reusable lid may have to make a secure fit, so as to prevent leaking of the contents of the container after the lid has been reapplied. Having a secure fit is of particular concern if the container is filled with material that is toxic or irritating to the skin and is used in or around a residence where small children are present, since their curiosity may cause them to remove the lid to view the contents of the container. Safety concerns demand that reusable lids not only make a substantially leak-proof fit with the container but also be difficult for children to remove, either accidentally or purposefully. However, as practical matter, commercial production of containers and lids that satisfy existing safety concerns necessarily requires control of manufacturing costs.

SUMMARY OF THE INVENTION

One object of the invention is to provide an improved and reusable lid for a container which can be re-applied repeatedly to provide a secure closure that prevents loss of the contents from the container.

Another object of the invention is to provide an improved reusable closure means for containers which is difficult for small children to remove yet is designed to securely seal the container so as to prevent loss of its contents.

A further object of the invention is to provide a reusable lid for a container for solids in powder or granular form which provides a secure seal regardless of the number of times the lid is re-applied.

In a preferred embodiment of the invention, the foregoing objects are attained by providing a container/lid combination wherein the upper end of the container has a peripheral skirt that is spaced from the wall of the container and has a plurality of openings, and a lid having a plurality of lock tabs that are received in the openings and serve to lock the lid to the container when the lid is rotated relatively to the container. In a preferred embodiment of the invention, each of the openings is elongated circumferentially of the container and comprise a relatively wide portion and relatively narrow portion, and the lock tabs comprise a depending body portion and a tapered lock portion at the bottom of the body portion. The lock tabs are sized so that their tapered lock portions can pass through the relatively wide portions of the openings and their body portions can fit in the relatively narrow portions of the openings. With this arrangement, the lid can be locked to the container by inserting the tabs through the relatively wide portions of the openings, and then rotating the lid so as to move the body portions of the tabs into the relatively narrow portions of the openings, whereupon the tapered lock portions of the tabs are engaged with the container and serve to secure the lid to the container. In an alternate embodiment, the openings on the container are rectangular and the tabs are shaped so as to have a depending body portion and a laterally-extending bayonet or arm portion that is spaced from the rim and is adapted to make a locking engagement with the container's skirt when the lid is rotated relative to the container. In both embodiments, it is preferred to provide a plurality of mutually spaced catch means on the exterior of the container and a latch means on the lid that is adapted to interlock with one of the catch means and thereby securely retain the lid on the container. The latch means is an integral part of the lid and is formed it can be deformed in a radial direction by a manually pressing action so as to disengage it from the associated catch means.

Other features and advantages of the invention are set forth in or rendered obvious by the following detailed description of a preferred embodiment of the invention, which is to be considered together with the drawings hereinafter described.

BRIEF DESCRIPTION OF THE DRAWINGS

In the drawings, like parts and elements thereof are identified by like numerals.

DETAILED DESCRIPTION OF THE INVENTION

Figure 1:
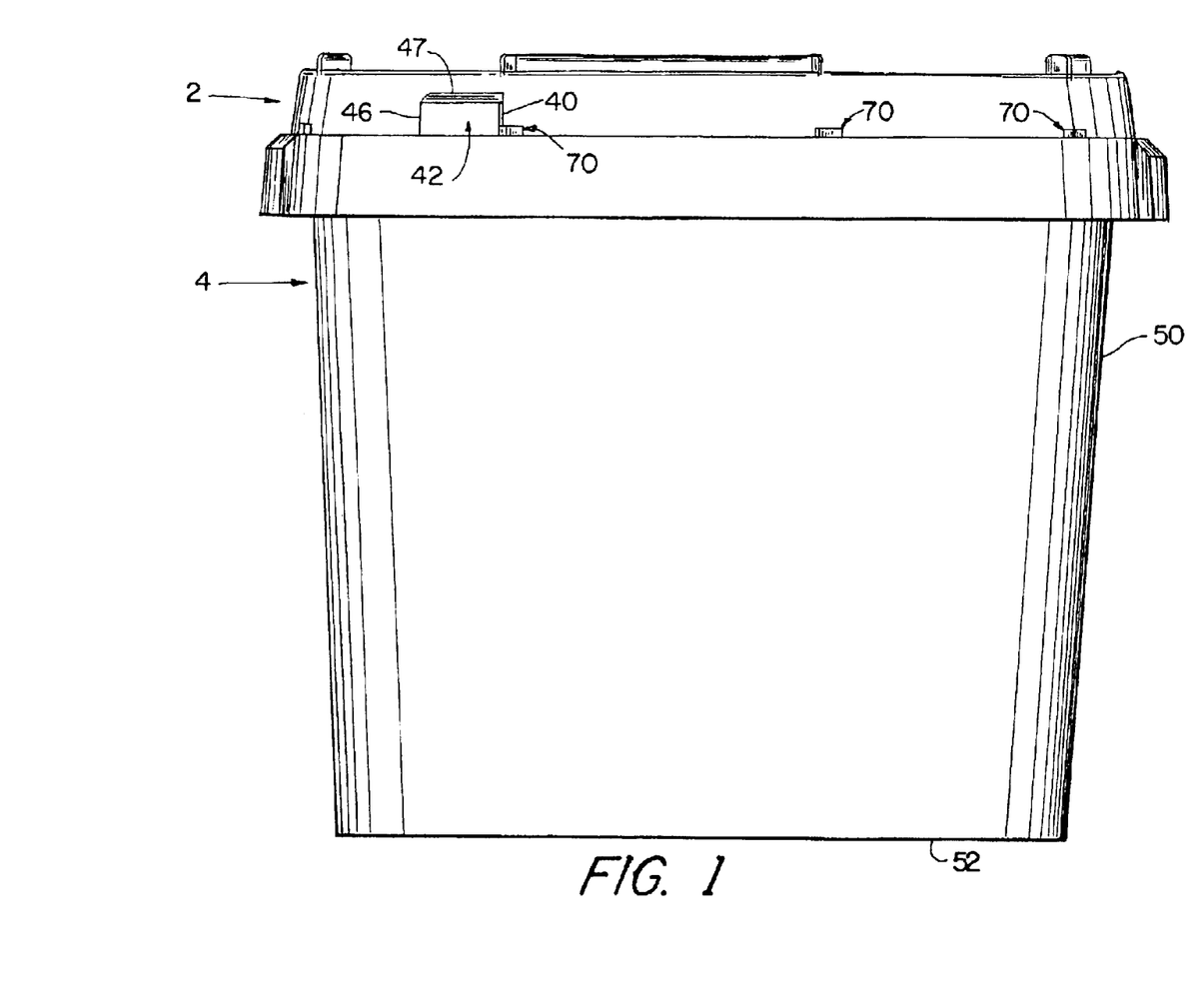
FIG. 1 is a side elevation of a lid and container lid constituting a preferred embodiment of the invention.
Figure 2:
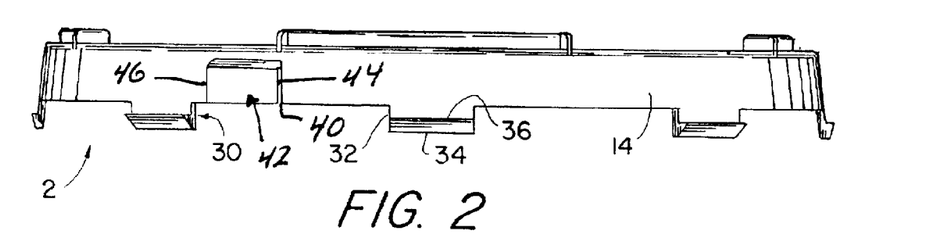
FIG. 2 is side elevation of the lid of FIG. 1.
Figure 3:
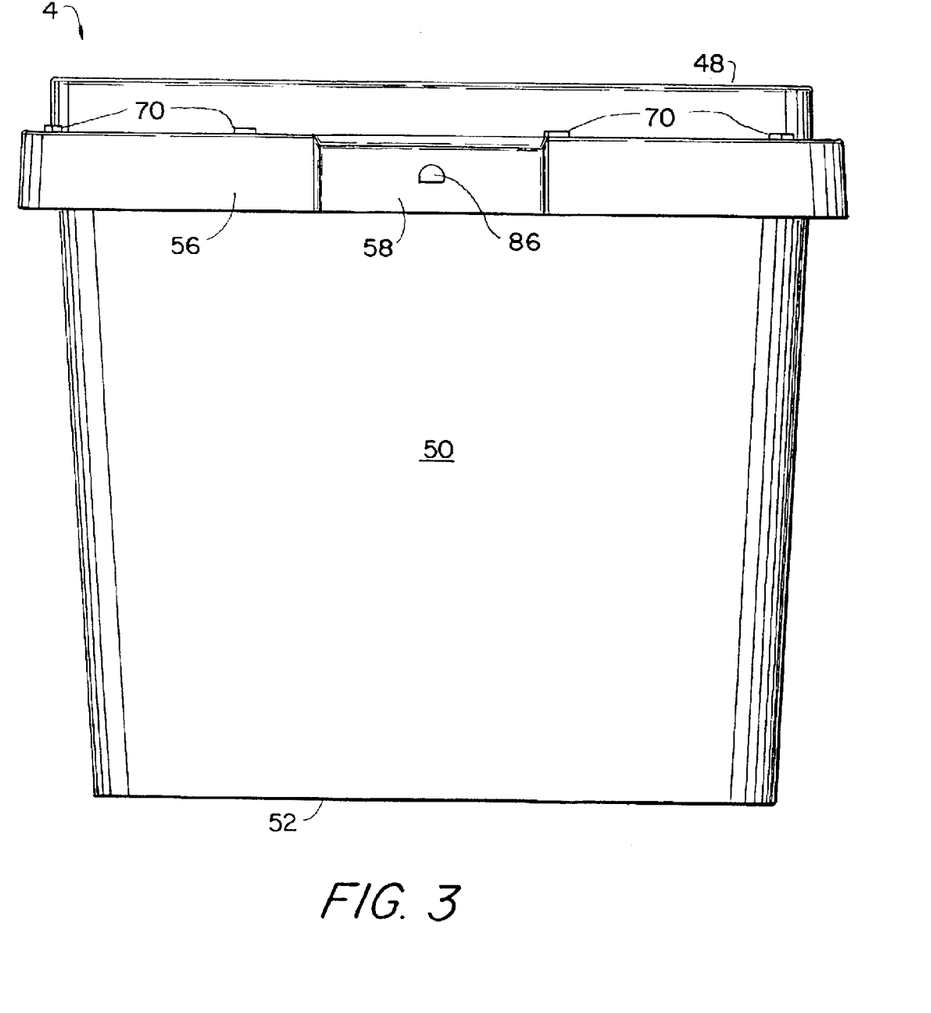
FIG. 3 is a side elevation of the container of FIG. 1.

Referring to FIGS. 1–3, a preferred embodiment of the invention comprises a circular lid 2 and a container 4 of circular cross-sectional configuration. Both the lid and the pail are molded of a plastic material that is relatively stiff yet resilient enough to allow limited flexing, e.g., polyethylene or another moldable thermoplastic resin, preferably a relatively high density thermoplastic material.

Figure 4:
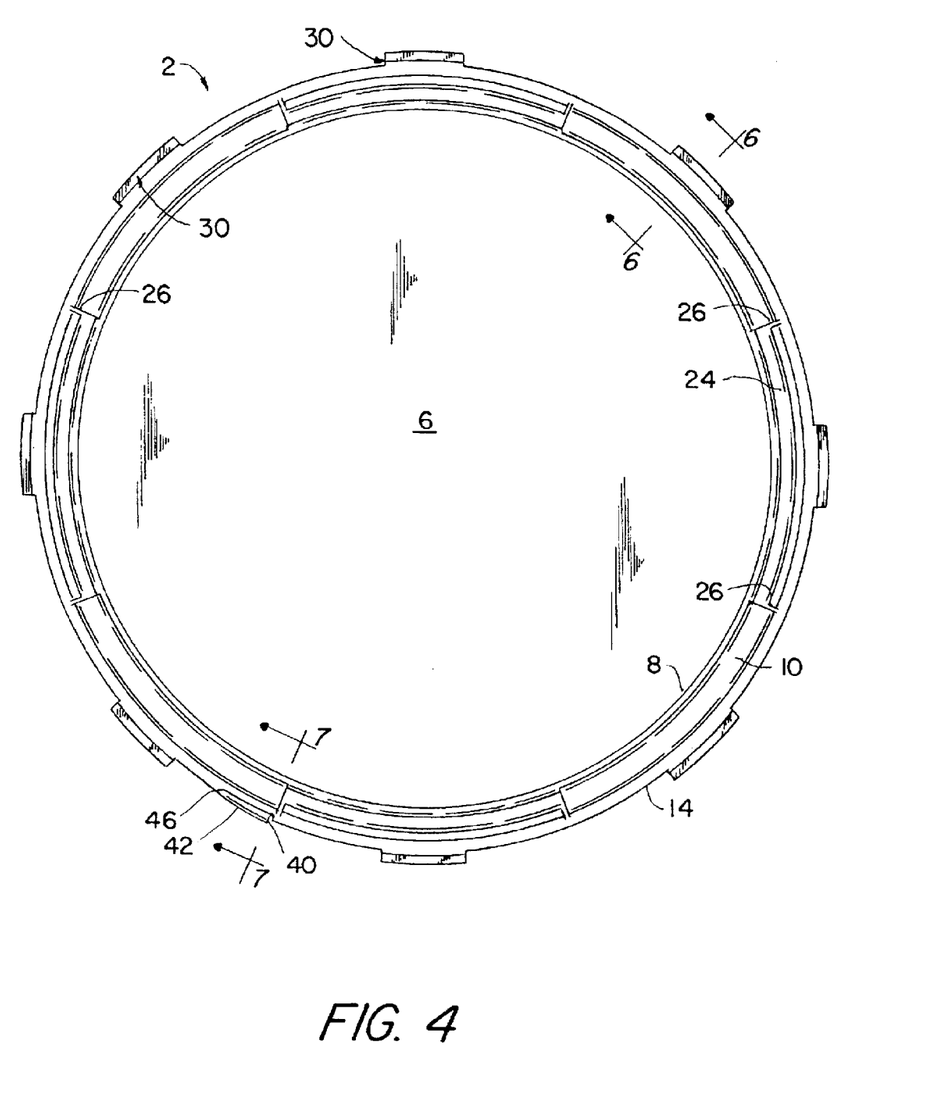
FIG. 4 is a plan view of the same lid.
Figure 5:
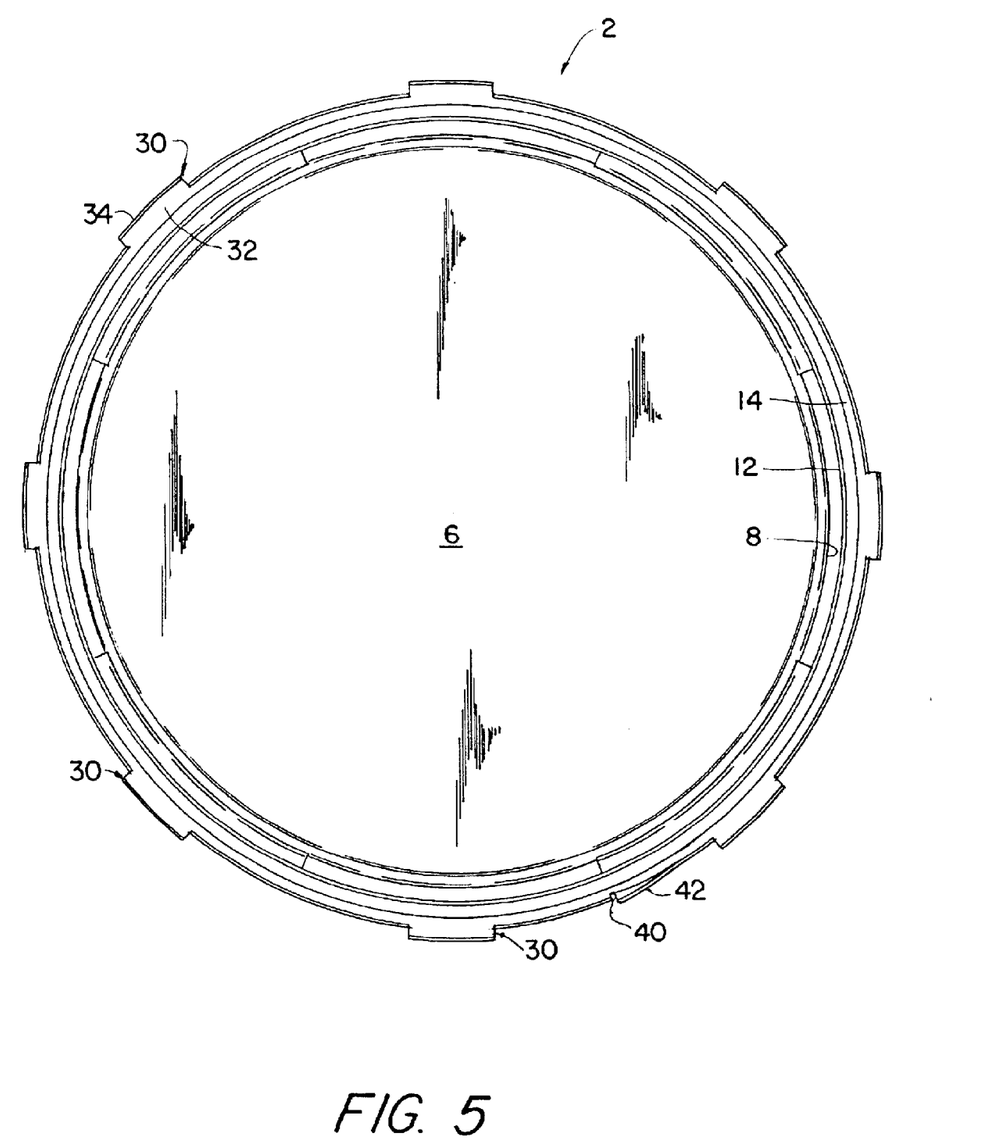
FIG. 5 is a bottom view of the same lid.
Figure 6:
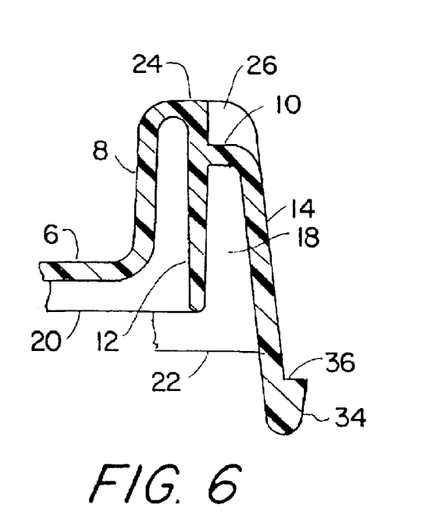
FIGS. 6 and 7 are cross-sectional views taken along lines 6—6 and 7—7 of FIG. 4.

As seen best in FIGS. 4–7, lid 2 is formed with a main body portion or crown 6 and a surrounding rim comprising an inner wall 8 that projects upwardly from the level of crown 6, a peripheral flange 10 attached to the upper end of wall 8, an intermediate wall 12 attached to and depending from flange 10, and an outer wall 14 attached to flange 10. Preferably, but not necessarily, outer wall 14 is slanted downwardly and outwardly as shown in FIGS. 1, 2 and 6. An annular channel 18 is formed between intermediate wall 12 and outer wall 14 and is sized to accommodate the upper end of container 4, as explained hereinafter. Intermediate wall 12 also functions to strengthen the rim. Preferably but not necessarily, the bottom edges 20 and 22 of walls 12 and 14 respectively project below the crown 6, as shown in FIG. 6. The upper surface of flange 10 is interrupted by several raised sections 24 having radially extending webs 26 at their opposite ends. Preferably the lid has four such sections as shown. These raise sections facilitate attachment and detachment of the lid relative to the container while still permitting upstanding inner wall 8 to serve as an alignment guide to facilitate the stacking of another container on top of the lid.

The lid also has a plurality of like locking tabs 30 attached to and depending from outer wall 14. Each tab 30 comprises a body portion 32 which is generally rectangular in horizontal cross-section, with a width (measured circumferentially of the lid) that is substantially greater than its thickness (measure radially of the lid). The bottom end portion 34 of each tab is enlarged so as to form an upwardly facing surface 36 that functions as a shoulder or lip for locking the tab to the container. Referring to FIG. 5, preferably the bottom end portion of each locking tab is tapered (as viewed radially of the lid), so as to facilitate attachment to the container in the manner explained hereinafter. Preferably the tabs are equally spaced about the lid to facilitate attachment of the lid to the container.

Figure 7:
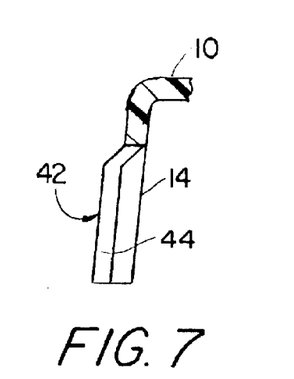

Referring to FIGS. 1, 2, 4, 5 and 7 the outer wall 14 has a vertically extending cut 40 therein, and adjacent that cut the wall 14 is formed with a projecting portion 42 that functions as a latch member that cooperates with a catch on the container to that prevent rotation of the lid in a direction to release it from the container. As is evident from the FIGS. 1 and 2, in side elevation latch member 42 has a generally rectangular configuration, having one end 44 demarcated by cut 20, an opposite end 46 and a top 47 that are integral with wall 14, and a bottom edge that is a continuation of the bottom edge of wall 14. As best seen in FIGS. 4, 5 and 7, the end 44 of latch member 42 projects radially outward beyond the outer surface of the adjacent portion of wall 14 on the opposite side of cut 40, and the remainder of latch member 42 is canted inwardly to where its end 46 is joined to wall 14. As described hereinafter in greater detail, the end 44 of latch member 42 is the part that provides the locking action. In this connection, it is to be appreciated that since the lid is made of a plastic such as high density polystyrene, the latch member 42 has a certain degree of flexibility, so that its end 44 can be made flush with the adjacent end of wall 14 by manually pressing it radially inward toward the lid's crown portion 6.

Referring to FIGS. 1, 3, and 8–11, the container 4 has an open top end 48 and a closed bottom defined by a circular side wall 50 and a bottom wall 52. To facilitate stacking, it is preferred that the container side wall be tapered as shown so as to have a smaller diameter at its bottom end. Adjacent to its open top end, the container is formed with a laterally extending annular flange 54 and a short depending side wall 56 at the outer edge of flange 54 that functions as a skirt. Preferably, but not necessarily, two diametrically opposed portions of wall 56 bulge outwardly, as shown at 58, so as to provide an increased space between it and side wall 50 for insertion of a person's fingers, thereby permitting those portions to function as grips or handles for lifting the container. Also preferably, but not necessarily, wall 56 is slanted downwardly and outwardly as shown in FIGS. 1 and 3.

Still referring to FIGS. 8–11, a plurality of openings identified generally at 62 are formed in flange 54 to accommodate locking tabs 30 of the container. Openings 62 are elongated circumferentially of flange 54 and comprise a first relatively wide portion 66 and a second relatively narrow portion 68. The length (circumferential dimension) and width (radial dimension) of each portion 66 is slightly greater, e.g., $1/16^{th}$ inch greater, than the corresponding dimension of the enlarged bottom ends of tabs 30. The narrow portions 68 of the openings have a length slightly greater than the corresponding dimension of tabs 30, while their width is less than the width of the enlarged bottom ends of tabs 30 but slightly greater than the body portions of tabs 30.

The lid is secured to the container by (a) placing the lid on the container so that its locking tabs are aligned with the relatively wide portions of opening 62, (b) inserting the tabs into the openings so that their relatively wide bottom portions are below the flange 54, and then rotating the lid so as to move the tabs into the narrow portions of openings 62, whereupon the shoulders 36 of the enlarged bottom ends of the locking tabs extend beneath adjacent portions of flange 54 and thereby prevent the lid from being lifted off of the container. The length (vertical dimension) of the locking tabs and the vertical position of shoulders 36 on the tabs are set so that the shoulders 36 will make a frictional engagement with the underside of flange 54 just sufficient to resist relative rotation of the lid in an unlocking direction in the absence of a manually applied turning force and also so that the liner tightly engages the upper end 48 of the pail, thereby assuring a tight seal.

Figure 8:
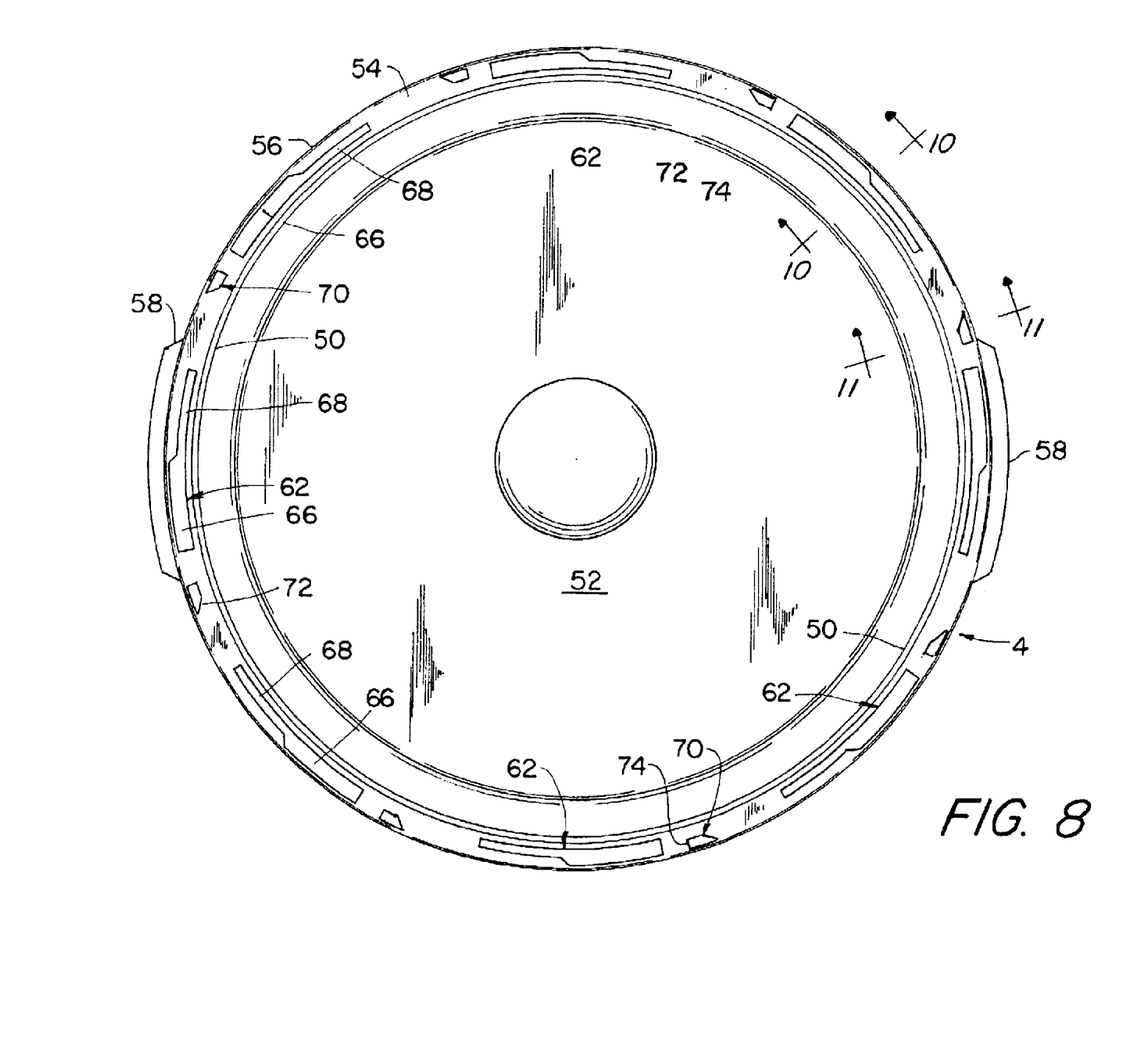
FIG. 8 is a plan view of the container.
Figure 9:
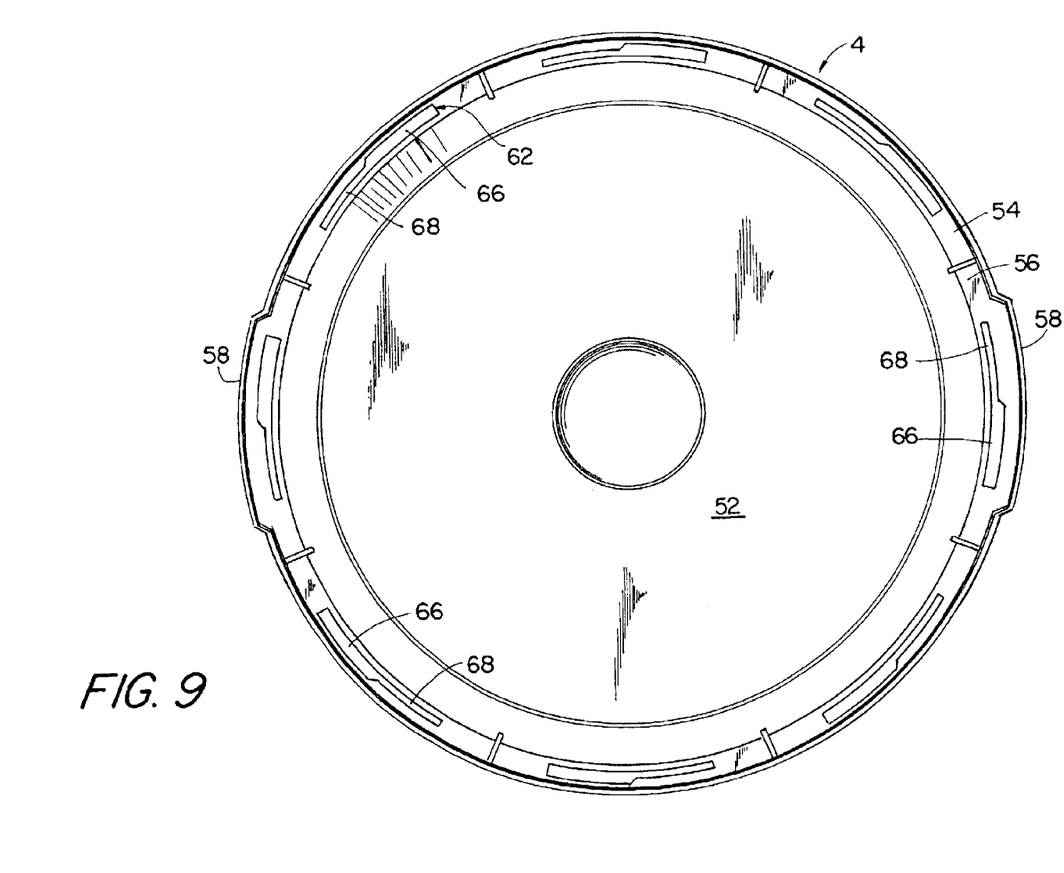
FIG. 9 is a bottom view of the container.
Figure 10:
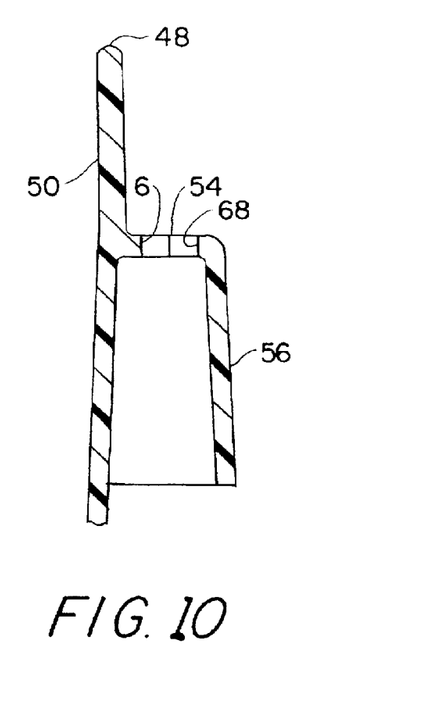
FIGS. 10 and 11 are cross-sections view taken along lines 10—10 and 11—11 of FIG. 8.
Figure 11:
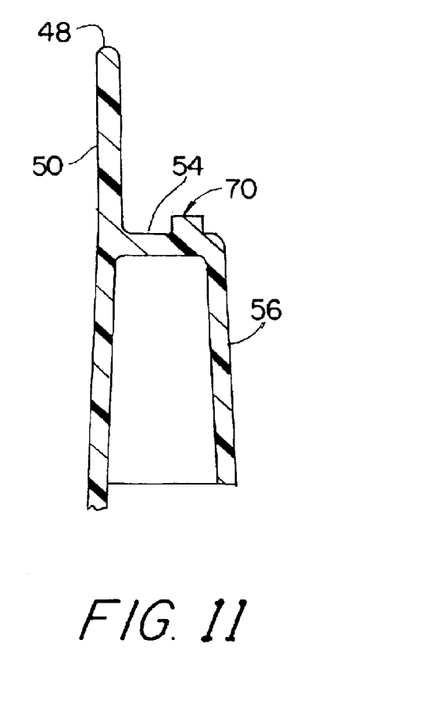

As shown in FIGS. 1, 3, 8, and 11, the lid/container combination provided by this invention also includes a plurality of upstanding projections 70 on the upper side of flange 54 that function as catches for latch member 42. Projections 70 are located close to the outer periphery of flange 54 and intermediate openings 62. Preferably, as shown in FIG. 8, projections 70 are located near the relatively wide portions of openings 62. The projections have a tapered vertically extending leading surface 72 and a right angle, substantially radially-extending trailing surface 74. The height of projections 70 is less than the corresponding dimension of latch member 42, as shown, so as to facilitate releasing the latch member. Preferably the height of projection 70 is equal to or less than one half the corresponding dimension of latch member 42. When the lid is applied to the container and rotated in the direction required to cause tabs 30 to interlock with flange 54 as described above, the leading end 46 of latch member 42 will pass by the nearest projection 70 and as the rotation continues, latch member 42 will be cammed inwardly by the adjacent projection, causing its end 44 to pass by the trailing surface 74 of the projection, whereupon the inherent resiliency of the tab member will cause it to return to its original outward projecting where it will be flush with or protrude outwardly of projection 70. Consequently if now an effort is made to rotate the lid in the opposite direction so that it can be released form the container, the projection 70 will intercept latch member 42 and thereby prevent unlocking of the lid from the container. However, the lid can be unlocked by simply depressing latch member inwardly far enough for it to be able to clear the adjacent projection when an effort is made to rotate the lid so as align the locking tabs with the large portions of the keyhole shaped openings 62.

Figure 12:
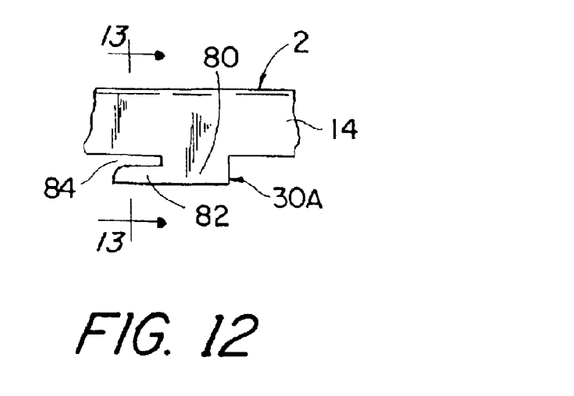
FIG. 12 is a fragmentary side view of the lid with a modified embodiment of locking tab.
Figure 13:
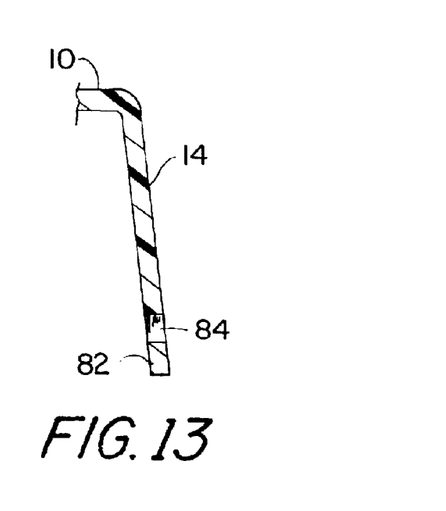
FIG. 13 is a fragmentary sectional view taken along line 13—13 of FIG. 12.
Figure 14:
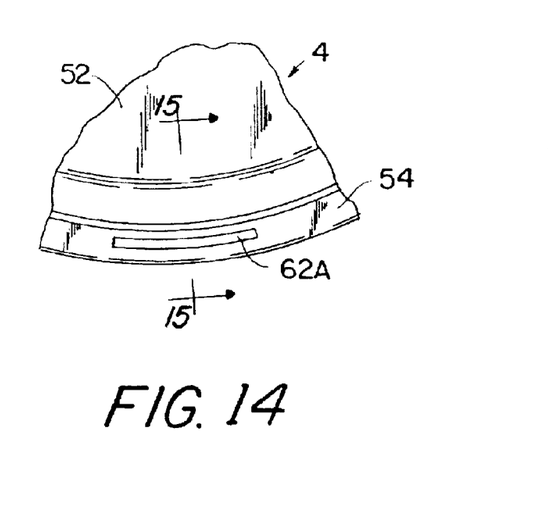
FIG. 14 is a fragmentary plan view of the container showing a modified form of opening for receiving a locking tab.
Figure 15:
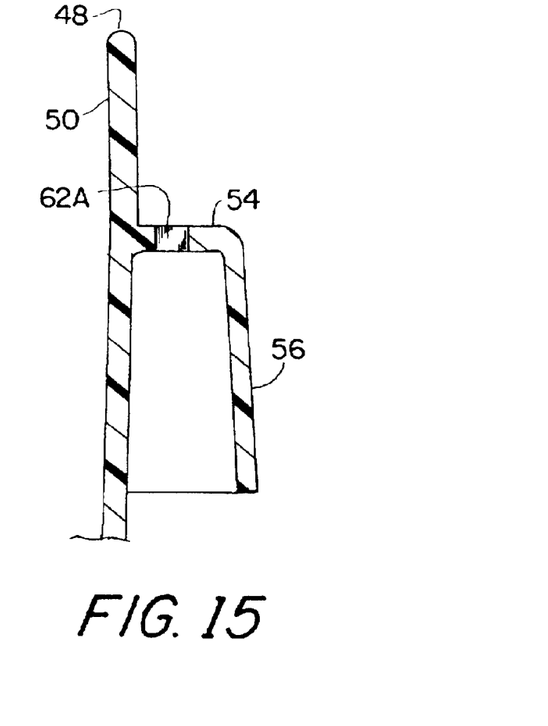
FIG. 15 is a fragmentary sectional view taken along line 15—15 of FIG. 14.

FIGS. 12–15 illustrate features of an alternative embodiment of the invention. These figures do not illustrate a complete lid and container, but it is to be understood that, except as otherwise disclosed hereinafter, the features shown in FIGS. 12–15 relate to a lid and container that are the same as those shown in FIGS. 1–11. As shown in FIG. 12, lid 2A has locking tabs 30A in the form of a body portion 80 that is integral with and depends from the lid's outer wall 12 and has at its bottom end a sidewise-extending arm 82 that functions as a bayonet. Body portion 80 and bayonet arm 82 have the same thickness (the dimension measured radially of the lid). Each bayonet 82 is formed so as to provide a gap 84 between its upper surface and the lower edge 20 of outer lid wall 12. The container 2A differs from container 2 in that the openings 62 are replaced by rectangular openings 62A. The width (radial dimension) of each opening 62A is slightly greater than the thickness of tabs 30a, while the length of the each opening 62A (the dimension measured circumferentially of the container) is slightly greater than the corresponding dimension (width) of the bottom end of the locking tabs. Preferably the openings 62a are sized so as to provide clearances of 1/32–1/16 inch for tabs 30A.

The alternative embodiment represented in FIGS. 12–16 is attached to the container by aligning tabs 30A with openings 62A, inserting the tabs in those openings, and then rotating the lid relative to the container in the direction (clockwise as viewed in FIG. 14) required to cause the bayonets arms to extend beneath adjacent portions of flange 54. Preferably the gap 84 between each bayonet arm and the adjacent bottom edge of the lid's side wall 12 is substantially the same as or only slightly larger (about 0.005" greater) than the thickness of the flange 54, whereby the bayonets arms will make a frictional engagement with the flange that is sufficient to prevent the lid from rotating relative to the container in the absence of a manually applied turning force and also assures that the lid will engage the upper end 48 of the container so as to provide a tight seal. Preferably this alternative embodiment includes the latch elements 42 and catches 70 of illustrated in FIGS. 1, 2, 4, 5, and 8–11, and those elements operate in the same way to releasably lock the lid to the container. Although this alternative embodiment offers substantially the same advantages, the embodiment of FIGS. 1–10 is preferred since the locking tabs 30 are easier to form by injection molding than the tabs 30A and also because they provide a more secure locking engagement with the container.

The invention is susceptible of a number of variations and modifications. Thus, for example, the container and lid may be modified to accommodate a liquid rather than a solid material in granular or powder form. For such application, a tight sealing relationship between the lid and the container may be further assured by inserting a resilient sealing ring (not shown) in channel 18. Preferably the sealing ring is an O-ring sized so as to be engaged and compressed by the upper edge of the container when the lid is secured to the container in the manner described above.

Also, although it is preferred that the lid have only one latch element 42, since it has been determined that a single latch member will provide adequate latching, it is contemplated that the lid may be formed with two such two latch elements for added safety, with the latch elements being disposed so that each is intercepted by one of the catches 70. Preferably the two latch elements would be located diametrically opposite one another. Having two latch elements is desirable since both would have to be released simultaneously in order to permit the lid to be rotate to detaching position. Such an arrangement would make it more difficult for a child to remove the lid, thus achieving a higher degree of safety.

Preferably the container is intended for use as a bucket or pail. Accordingly, as an optional measure, each of the bulge portions 58 is formed with a hole 86 to accommodate an arched handle or bail, whereby the container can function as a pail or bucket. It also is contemplated that the container need not have handle portions 58 or a bail-type handle, but instead the container may have no handle or a different type of handle. Although the lid is illustrated at having a substantially flat crown, it is contemplated that it may be corrugated for added stiffness or for ornamental reasons, e.g., like the circular corrugations of the lid shown in U.S. Pat. No. 4,930,656 issued to H. J. Blanchette.

The foregoing modifications, and still other modifications rendered obvious to a person skilled in the art from the foregoing description and the drawings, may be made without departing from the spirit and scope of the present invention.

The advantages of the invention are several. For one thing the entire specific designs can be implemented by conventional injection molding techniques and apparatus, an important cost factor. For another thing, locking tabs and the openings therefor in the container assure easy and secure attachment of the lid to the container. Another advantage resides in the fact that the locking operation of latch element 42 on the lid vis-à-vis the catches on the container is reliable and automatic. When the lid is to be assembled to the pail, if the lid is rotated clockwise relative to the pail (as viewed in FIG. 4), latch member 42 will contact one of the catches 70 and due to its resiliency, as the lid continues rotation in the same direction, it will be forced inwardly toward the center axis of the container by the contacted catch 70, whereby the latch member will "ride over" that particular catch. The angular face on each of the catches 70 facilitates the inward camming action on latch member 42 as the lid is rotated clockwise (as seen in FIG. 4). Due to its resiliency, latch member 42 will return automatically to its original outwardly projecting position (shown in FIGS. 4, 5 and 7) when it has moved past the catch which caused it to be cammed inward. However, on counter-clockwise movement of the lid, that same catch will intercept the outwardly projecting end 44 of the latch member and thereby stop the lid from being turned to the angular position required to releases the locking tabs from the openings 62 or 62A. Because of the inherent resiliency of the latch member, releasing the latch member from the interfering catch is accomplished by manually depressing the latch member inward while simultaneously rotating the lid counter-clockwise. Other advantages will be obvious to persons skilled in the art.

What is claimed is:

1. A lid/container combination comprising:

a molded lid having a central crown portion, a circularly shaped rim portion surrounding said crown portion, mutually spaced locking tabs formed integral with and depending from said rim portion, each locking tab comprising a body portion that depends from said rim and has a bottom end and an enlarged locking portion on said bottom end of said body portion characterized by a shoulder that faces upward and extends both circumferentially and radially of said rim, and latch means projecting from said rim; and a container having an open end, a closed end, a first circumferentially continuous side wall extending from said open end to said closed end, a radially-extending annular wall attached to and surrounding said side wall at said open end, said annular wall having an upper surface, a second side wall attached to and depending from said annular wall, said second side wall being spaced from said first side wall, a plurality of openings in said annular wall, each of said openings comprising a first portion that is wide enough to accept said body portion and said enlarged locking portions of said tabs and a second portion that is wide enough to accommodate said body portion but too narrow to accept said enlarged locking portion, and a plurality of mutually spaced catch members projecting upward from said upper surface in position so that said latch means can releasably engage one of said catch members when said lid is secured to said container;

whereby said lid (a) may be coupled to said container by inserting said tabs into said first portions of said holes and (b) may be secured to said container by rotating said lid relative to said container in a direction to shift said tabs so that said shoulders underlie said annular wall and thereby prevent said tabs from being pulled out of said openings, and engagement of said latch means with one of said catch members prevents relative rotation of said lid and container in a direction that would permit removal of said locking tabs from said openings.

2. A container/lid combination comprising:

a container having an open end, a closed end, a first circumferentially continuous side wall extending from said open end to said closed end, a transversely-extending annular wall attached to and surrounding said side wall at said open end, a second circumferentially continuous side wall attached to and depending from said annular wall, said second side wall being spaced from and surrounding said first side wall, and a plurality of openings in said annular wall; and a molded lid having a central crown, a circularly shaped rim surrounding said crown comprising an annular flange and a circumferentially continuous side wall depending from said flange, said flange having an outer periphery and said depending side wall of said rim being located at the periphery of said flange and having a bottom end, and mutually spaced locking tabs formed integral with and depending from said bottom end of said depending side wall of said rim, each of said locking tabs comprising a body portion having a bottom end with a radially enlarged locking portion that is characterized by a shoulder that faces upwardly and extends both circumferentially and radially outward of said depending side wall of said rim;

each of said openings in said annular wall comprising a first portion that is sized to accept said body portion and said enlarged locking portion of one of said tabs and a second portion that is sized to accommodate said body portion but not said radially enlarged locking portion of one of said tabs, whereby said lid (a) may be coupled to said container by inserting said locking portions of said tabs through said first portions of said holes, and (b) may be secured to said container by rotating said lid relative to said container in a direction to shift said tabs so that said body portions reside in said second portions of said holes and said shoulders underlie and engage said annular wall and thereby prevent said tabs from being pulled out of said openings.

3. A container/lid combination according to claim 2 wherein said first and second portions of said openings each have an outer edge with the outer edges of said first portions being located at a greater distance from the center of said lid than the outer edges of said second portions.

4. A container/lid combination according to claim 2 wherein said depending side wall of said rim has a maximum diameter less than that of said annular wall.

5. A container/lid combination according to claim 4 wherein said annular wall has an upper surface and said container is provided with a plurality of mutually spaced catch members that project upward from said upper surface, and further wherein said rim comprises a latch means on its periphery for releasably engaging one of said catch members and thereby preventing relative rotation of said lid and container in a direction that would permit removal of said locking tabs from said openings.

6. A container/lid combination according to claim 5 wherein said rim has a lower edge and said latch means comprises a radially-projecting portion of said rim that projects outwardly far enough to be intercepted by one of said catch members when lid is applied to said container, said radially-projecting portion having an end edge that is demarcated by a silt in said rim that intersects said lower edge whereby under a manually applied force said radially-projecting portion can yield inwardly far enough to disengage it from an interfering catch member and thereby permit rotation of said lid in a direction to permit removal of said locking tabs from said openings.

7. A container/lid combination according to claim 6 wherein said continuous side wall at said container has an upper and edge and said annular wall is spaced below said upper end edge, said rim comprises concentric inner and outer walls, said slit is in said outer wall, and said upper end edge of said continuous side wall projects above said annular wall and is received between said inner and outer walls of said rim.

8. A container/lid combination according to claim 2 wherein said first side wall of said container has an upper end edge and said rim comprises concentric inner and outer depending walls, and further wherein said upper end edge of said first side wall is received between said inner and outer walls of said rim when said lid is attached to said container.

9. A container/lid combination according to claim 8 wherein said annular wall has a top surface, and further wherein when said lid is attached to said container via interlocking of said tabs and said annular wall, said outer wall of said rim will be engaged with said top surface of said annular top wall.

10. A container/lid combination comprising a container and a lid adapted for connection to said container, said container having an open top end and a closed bottom end defined by a tubular side wall and a bottom wall formed integral with said side wall, said side wall having a top end portion, a flat annular flange formed integral with and extending radially outward from said tubular side wall adjacent to said top end portion, a skirt formed integral with and depending from said annular flange in surrounding spaced relation to said side wall, and a plurality of like circumferentially-spaced holes in said flange, each hole being elongate circumferentially of said flange and comprising a first portion having a relatively large dimension measured radially of the container and a second portion contiguous with said first portion having a relatively small dimension measured radially of the container; and a lid for closing off said open top end of said container, said lid comprising a crown portion and a rim formed integral with and surrounding said crown portion, said rim being characterized by concentric inner and outer walls formed so as to accommodate therebetween said top end portion of said tubular side wall, said inner and outer walls each having a bottom end, and a plurality of mutually spaced locking tabs formed integral with and depending from said bottom end of outer wall, said tabs being shaped and sized to fit in said first portions of said holes and the spacing of said locking tabs being such as to permit all of said locking tabs to be aligned with and inserted into said holes, each locking tab being hook-shaped in radial cross-section and having an upwardly facing surface that is exposed in said first portions of said holes when said lid is in a first rotational position relative to said container and underlies and engages said flange radially of said second portions of said holes when said lid is in a second rotational position relative to said container.

11. A container/lid combination according to claim 10 wherein said flange has an outer edge and said skirt is formed integral with said outer edge of said flange.

12. A container/lid combination according to claim 11 wherein said skirt has a bottom edge and said bottom end of said outer wall of said rim is engaged with said flange when said locking tabs are located in said holes and said lid is in said second rotational position.

13. A container/lid combination comprising:
   a container having an open end, a closed end, a first circumferentially continuous side wall extending from said open end to said closed end, a transversely-extending annular wall attached to and surrounding said first side wall adjacent to said open end, a second side wall attached to and depending from said annular wall, said second side wall surrounding and spaced from said first side wall, a plurality of openings in said annular wall, and a plurality of mutually spaced catch members that project upwardly from said annular wall;
   a molded lid having a central crown portion, a circularly shaped rim portion surrounding said crown portion and comprising concentric inner and outer walls defining a channel therebetween for accommodating the upper end of said continuous side wail, and mutually spaced locking tabs formed integral with and depending from said rim portion;
   said openings and locking tabs being shaped so that (a) said tabs can be inserted in said openings when said lid is in a first rotational position relative to said container and (b) said tabs extend under and are restrained by said annular wall when said lid is in a second rotational position relative to said container, whereby said lid can be applied to or detached from said container when said lid is in said first rotational position and is locked to said container when said lid is in said second rotational position; and
   a latch means on the periphery of said rim for releasably engaging one of said catch members and thereby preventing relative rotation at said lid and container in a direction that would permit removal of said locking tabs from said openings, said latch means comprising an outwardly bulging portion of said side wall and a separation between one end of said bulging portion and said side wall, whereby said bulging portion may be deformed manually to disengage it from a catch member with which it is engaged and thereby permit said lid to be rotated in a direction to permit removal of said tabs from said openings.

14. A lid/container combination comprising:
   a molded lid having a circular central crown portion, a circularly shaped rim portion surrounding said crown portion, said rim portion comprising a radially projecting annular flange having an outer edge, a circumferentially continuous wall of circular cross-sectional shape formed integral with and depending from said radially projecting flange at said outer edge, said wall having a bottom edge, and a plurality of locking tabs formed integral with and depending from said wall, said locking tabs being spaced along said bottom edge with each locking tab comprising a top body portion that is formed integral with said wall and has a bottom end and an enlarged locking portion on said bottom end of said body portion, said enlarged locking portion being characterized by a shoulder that faces upward and extends radially outward of said top body portion; and
   a container having an open end, a closed end, a first circumferentially continuous side wall extending from said open end to said closed end, a transversely extending radially-extending annular wall attached to and surrounding said side wall at said open end, a second side wall attached to and depending from said annular wall, said second side wall being spaced from and surrounding said first side wall, and a plurality of openings in said annular wall, each of said openings comprises a first portion that is wide enough to accept said body portion and said enlarged locking portion of one of said locking tabs and a second portion that is wide enough to accommodate said body portion but too narrow to accept said enlarged locking portion of one of said locking tabs;
   said openings and locking tabs being shaped and spaced so that (a) said enlarged locking portions of said locking tabs can be inserted through said openings when said lid is in a first rotational position relative to said container and (b) said shoulders of said locking tabs extend under and are restrained by said annular wall of said container when said lid is in a second rotational position relative to said container, whereby said lid can be applied to or detached from said container when said lid is in said first rotational position and is locked to said container when said lid is in said second rotational position.

15. The combination of claim 14 wherein said wall of said rim portion has an outer surface, and said top body portions of said tabs have, an outer surface that is a continuous with said outer surface of said wall of said rim portion.

16. The combination of claim 15 wherein said rim portion has another circumferentially continuous wall depending from said flange, said another circumferentially continuous wall being concentric with a surrounded by said first named circumferentially continuous wall of said rim portion, and said first side wall of said container extends between said two circumferentially continuous walls of said rim portion when said lid is locked to said container.

17. The combination of claim 14 wherein when said lid is attached to said container via interlocking of said tabs and top annular wall, said outer wall of said rim will be engaged with said annular top wall.

18. The combination of claim 17 including a latching means comprising a latch element and a plurality of catch elements, said latch element being an integral portion of said rim, and said catch elements being mounted on and spaced along said top annular wall, whereby when said lid is assembled to said container, said latch element and one of said catch elements will engage one another to provide a latching function to prevent rotation of the lid in a direction to free it from the container.

19. The combination of claim 18 wherein the latch element comprises an outwardly deformed portion of said second wall of said rim, with one end of said latch element being demarcated by a slit in said second wall, said one end of said latch element being in position to engage one of said catch elements when said lid is placed on said container and being depressable inwardly of said lid far enough to clear said catch element and thereby permit relative rotation of the lid on the container.

20. The combination of claim 19 wherein said catch elements are located dose to the outer margin of said top annular wall.

* * * * *

UNITED STATES PATENT AND TRADEMARK OFFICE
CERTIFICATE OF CORRECTION

PATENT NO. : 6,851,569 B2
DATED : February 8, 2005
INVENTOR(S) : Rino Conti et al.

It is certified that error appears in the above-identified patent and that said Letters Patent is hereby corrected as shown below:

Column 8,
Line 14, insert -- said -- before "lid";
Line 24, change "and edge" to -- end edge --;

Column 9,
Line 35, change "wail" to -- wall --;

Column 10,
Line 41, delete "a";
Line 46, change "a" to -- and --; and

Column 12,
Line 2, change "dose" to -- close --.

Signed and Sealed this

Seventeenth Day of May, 2005

JON W. DUDAS
*Director of the United States Patent and Trademark Office*